(12) United States Patent
Cullinane

(10) Patent No.: US 11,400,408 B2
(45) Date of Patent: Aug. 2, 2022

(54) COMPACT REGENERATION OF LIQUID DESICCANT

(71) Applicant: ExxonMobil Upstream Research Company, Spring, TX (US)

(72) Inventor: John Timothy Cullinane, Montgomery, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/940,972

(22) Filed: Jul. 28, 2020

(65) Prior Publication Data

US 2021/0069634 A1  Mar. 11, 2021

Related U.S. Application Data

(60) Provisional application No. 62/896,761, filed on Sep. 6, 2019.

(51) Int. Cl.
*B01D 53/14* (2006.01)
*B01D 53/26* (2006.01)

(52) U.S. Cl.
CPC ....... *B01D 53/1425* (2013.01); *B01D 53/263* (2013.01); *B01D 2252/2023* (2013.01); *B01D 2256/24* (2013.01); *B01D 2257/80* (2013.01)

(58) Field of Classification Search
None
See application file for complete search history.

(56) References Cited

U.S. PATENT DOCUMENTS

| | | | |
|---|---|---|---|
| 3,001,373 A * | 9/1961 | Eastman | B01D 53/1425 62/632 |
| 3,105,748 A | 10/1963 | Stahl | |
| 3,349,544 A | 10/1967 | Arnold et al. | |
| 3,397,731 A * | 8/1968 | Wood | C07C 9/04 159/16.1 |
| 3,492,787 A * | 2/1970 | McMinn | B01D 53/263 95/191 |
| 3,648,434 A * | 3/1972 | Gravis, III | B01D 1/00 95/192 |
| 4,005,997 A | 2/1977 | Fowler et al. | |
| 4,009,083 A * | 2/1977 | Lyon | B01D 53/263 203/49 |
| 4,073,832 A | 2/1978 | McGann | |
| 4,455,157 A * | 6/1984 | Honerkamp | B01D 53/263 261/114.2 |

(Continued)

FOREIGN PATENT DOCUMENTS

WO  WO 2018/166937  9/2018

*Primary Examiner* — Tam M Nguyen
(74) *Attorney, Agent, or Firm* — Vorys, Sater, Seymour and Pease LLP

(57) ABSTRACT

A method for regenerating liquid desiccant is described herein. The method includes co-currently contacting a rich desiccant stream including water with a stripping gas within a co-current contacting system such that the stripping gas removes at least a portion of the water from the rich desiccant stream, producing a wet stripping gas and a lean desiccant stream. The method also includes removing the water from the wet stripping gas within a stripping gas separation system, regenerating the stripping gas, and recirculating the stripping gas to the co-current contacting system.

13 Claims, 10 Drawing Sheets

(56) References Cited

U.S. PATENT DOCUMENTS

| | | | | |
|---|---|---|---|---|
| 5,453,114 A * | 9/1995 | Ebeling | ................ | B01D 53/263 |
| | | | | 95/166 |
| 5,643,421 A * | 7/1997 | Smith | .................... | B01D 3/143 |
| | | | | 202/158 |
| 6,299,671 B1 * | 10/2001 | Christensen | ........... | B01D 53/28 |
| | | | | 95/166 |
| 2007/0209512 A1 * | 9/2007 | Seibert | ................. | B01D 53/263 |
| | | | | 95/193 |
| 2008/0041228 A1 * | 2/2008 | Seibert | ................. | B01D 53/263 |
| | | | | 95/166 |
| 2011/0247489 A1 * | 10/2011 | Witherspoon | ....... | B01D 53/263 |
| | | | | 95/18 |
| 2014/0335002 A1 * | 11/2014 | Northrop | ................ | E21B 43/40 |
| | | | | 423/228 |
| 2015/0298052 A1 * | 10/2015 | Lugosch | ............ | B01D 53/1425 |
| | | | | 95/161 |
| 2018/0154304 A1 * | 6/2018 | Johannessen | ...... | B01D 53/1493 |
| 2020/0061523 A1 * | 2/2020 | Cullinane | ............ | B01D 53/1406 |
| 2021/0069638 A1 * | 3/2021 | Philbrook | ............ | B01D 53/526 |

* cited by examiner

400

500

500

500

500

COMPACT REGENERATION OF LIQUID DESICCANT

CROSS REFERENCE TO RELATED APPLICATIONS

This application claims the priority benefit of U.S. Provisional Patent Application No. 62/896,761, filed Sep. 6, 2019, entitled COMPACT REGENERATION OF LIQUID DESICCANT.

FIELD

The present techniques provide for the regeneration of liquid desiccant within a gas processing system including a co-current flow scheme. More specifically, the present techniques provide for the removal of water from a natural gas stream using liquid desiccant within a gas dehydrator including one or more co-current contacting systems, and the regeneration of the liquid desiccant within a desiccant regenerator including one or more co-current contacting systems.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Natural gas streams produced from a reservoir typically contain impurities, such as water and acid gases, i.e., hydrogen sulfide ($H_2S$) and carbon dioxide ($CO_2$). Such impurities are often removed prior to industrial or residential use. For example, natural gas streams are typically dehydrated to around 112.37 milligrams of water per cubic meter of gas ($mg/m^3$) (7 pounds of water per million standard cubic feet of gas (lb/MMscf)). For cold environments or cryogenic processing, lower specifications, such as around 32.106 $mg/m^3$ (2 lb/MMscf), may be required. In addition, natural gas streams are typically purified to concentrations of less than 4 ppm $H_2S$ and less than 2 volume % (vol. %) $CO_2$.

The dehydration of natural gas is performed to control the formation of gas hydrates and to prevent corrosion in distribution pipelines. The formation of gas hydrates and corrosion in pipelines can cause a decrease in flow volume as well as frozen control valves, plugged orifices, and other operating problems.

Traditionally, the removal of water using liquid desiccant, such as liquid glycol, involves contacting the raw natural gas stream in a counter-current flow with the absorbent liquid. The raw natural gas stream is introduced into the bottom section of a contacting tower. At the same time, the liquid desiccant stream is directed into the top section of the tower. The tower has trays, packing, or other "internals." As the liquid desiccant stream cascades through the internals, it absorbs the undesirable components, carrying them away through the bottom of the contacting tower as part of a rich desiccant solution. At the same time, gaseous fluid that is largely depleted of water exits at the top of the tower.

Following absorption, the water is typically separated from the rich desiccant solution within a regenerator, producing a lean desiccant stream that may be recycled into the contacting tower for further absorption. Within a conventional regenerator, the rich desiccant solution is typically fed into a distillation column. A reboiler at the bottom of the distillation column provides heat to the rich desiccant solution. The rich desiccant solution and the boiling vapors from the reboiler are in intimate counter-current contact, liberating water vapor from the rich desiccant solution and regenerating the lean desiccant stream that is mostly devoid of water. The vapor is then cooled at the top of the distillation column by cross-exchanging the vapor with the cool, rich desiccant solution. This condenses the desiccant within the vapor to prevent desiccant loss.

In some circumstances, it is desirable to further contact the lean desiccant stream with a stripping gas. This removes more water than is possible with a thermal treatment alone. With less water in the lean desiccant stream, the lean desiccant stream can treat the natural gas stream to a lower dew point. The stripping gas can be nitrogen, dry methane, or other compatible gases.

However, as described above, conventional contactors used for gas dehydration and desiccant regeneration utilize counter-current flow schemes. As a result, such contactors tend to be very large and heavy. This creates particular difficulty in offshore oil and gas production applications where smaller equipment is desirable. Further, the transport and set-up of large tower-based facilities is difficult for shale gas production operations that frequently take place in remote locations. Additionally, large tower-based facilities can be impractical if subsea gas processing is desired, as towers must be very thick-walled to withstand the high external pressures on the sea floor.

SUMMARY

An exemplary embodiment provides a desiccant regenerator, including a co-current contacting system configured to co-currently contact a rich desiccant stream including water with a stripping gas such that the stripping gas removes at least a portion of the water from the rich desiccant stream, producing a wet stripping gas and a lean desiccant stream. The desiccant regenerator also includes a stripping gas separation system configured to remove the water from the wet stripping gas, regenerating the stripping gas. The desiccant regenerator is configured to recirculate the stripping gas into the co-current contacting system.

Another exemplary embodiment provides a method for regenerating liquid desiccant. The method includes co-currently contacting a rich desiccant stream including water with a stripping gas within a co-current contacting system such that the stripping gas removes at least a portion of the water from the rich desiccant stream, producing a wet stripping gas and a lean desiccant stream. The method also includes removing the water from the wet stripping gas within a stripping gas separation system, regenerating the stripping gas, and recirculating the stripping gas to the co-current contacting system.

Another exemplary embodiment provides a gas processing system. The gas processing system includes a gas dehydrator, which is configured to co-currently contact a natural gas stream including water with a lean desiccant stream within a first co-current contacting system to produce a dehydrated natural gas stream and a rich desiccant stream including the water, and send the rich desiccant stream to a desiccant regenerator. The gas processing system also includes the desiccant regenerator, which is configured to co-currently contact the rich desiccant stream with a stripping gas within a second co-current contacting system to produce a lean desiccant stream and a wet stripping gas including the water, remove the water from the wet stripping gas within a stripping gas separation system to regenerate the stripping gas, and recirculate the stripping gas to the second co-current contacting system. The gas processing system is configured to recycle the lean desiccant stream to the gas dehydrator.

Another exemplary embodiment provides another method for regenerating liquid desiccant. The method includes increasing a temperature of a rich desiccant stream including water using a heating device and co-currently contacting the rich desiccant stream with a stripping gas within a co-current contacting system such that the stripping gas removes at least a portion of the water from the rich desiccant stream, producing a wet stripping gas and a lean desiccant stream. The method also includes removing residual desiccant from the wet stripping gas within a desiccant separation system, decreasing a temperature of the wet stripping gas using a cooling device, and removing the water from the wet stripping gas within a stripping gas separation system, regenerating the stripping gas. The method further includes recirculating the stripping gas into the co-current contacting system.

DESCRIPTION OF THE DRAWINGS

The advantages of the present techniques are better understood by referring to the following detailed description and the attached drawings, in which.

DETAILED DESCRIPTION

Figure 1:
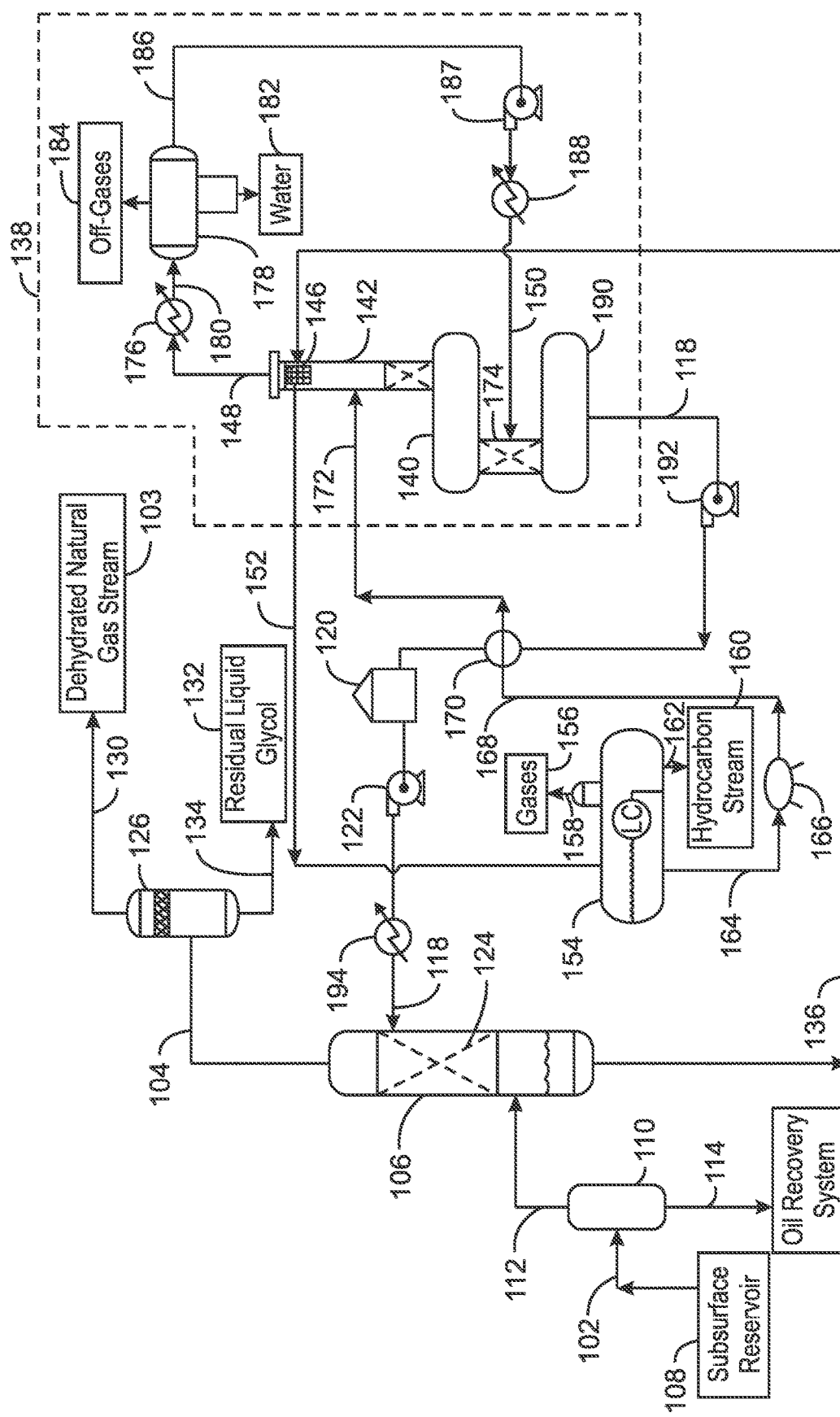
FIG. 1 is a process flow diagram of a conventional gas processing system that employs the Drizo™ process for desiccant regeneration.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

As used herein, the terms "about" and "around" mean±10% of the subsequent number, unless otherwise stated.

"Acid gas" refers to any gas that dissolves in water, producing an acidic solution. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

The terms "approximate," "approximately," "substantial," and "substantially" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "co-current contactor" refers to a vessel that receives a stream of gas and a separate stream of absorbent liquid, such as liquid desiccant, in such a manner that the gas stream and the absorbent liquid contact one another while flowing in generally the same directions within the contactor.

The term "co-currently" refers to the internal arrangement of process streams within a unit operation that can be divided into several sub-sections by which the process streams flow in the same direction.

As used herein, a "column" is a separation vessel in which a counter-current flow is used to isolate materials on the basis of differing properties. In an absorbent column, an absorbent liquid is injected into the top, while a mixture of gases to be separated is flowed through the bottom. As the gases flow upwards through the falling stream of absorbent liquid, one gas species is preferentially absorbed, lowering its concentration in the vapor stream exiting the top of the column. A portion of the overhead vapor may be condensed and pumped back into the top of the column as a reflux stream, which can be used to enhance the separation and purity of the overhead product. A bulk liquid stripper is related to a fractionation column. However, the bulk liquid stripper functions without the use of a reflux stream and, thus, cannot produce a high-purity overhead product.

In a distillation column, a gas stream may be separated into multiple components based on boiling point or vapor pressure differences. The high vapor pressure, or lower boiling point, components will tend to concentrate in the vapor phase, whereas the low vapor pressure, or higher boiling point, components will tend to concentrate in the liquid phase. Cryogenic separation is a separation process carried out in a column at least in part at temperatures at or below −123.15° C., or 150 degrees Kelvin (K). To enhance the separation, both types of columns may use a series of vertically spaced trays or plates mounted within the column and/or packing elements such as structured or random packing. Columns may often have a recirculated stream at the base to provide heat energy for boiling the fluids, called reboiling.

The term "dehydrated natural gas stream" refers to a natural gas stream that has undergone a dehydration process. Typically, the dehydrated natural gas stream has a water content of less than 112.37 milligrams of water per cubic meter of gas ($mg/m^3$) (7 pounds of water per million standard cubic feet of gas (lb/MMscf)). Moreover, for cold environments or cryogenic processing, lower specifications, such as 32.106 $mg/m^3$ (2 lb/MMscf), may be required.

As used herein, the term "dehydration" refers to the pre-treatment of a raw feed gas stream to partially or completely remove water and, optionally, some heavy hydrocarbons. This can be accomplished by contacting the gas stream with a desiccant, such as monoethylene glycol (MEG), diethylene glycol (DEG) or triethylene glycol (TEG), for example.

The term "distillation," or "fractionation," refers to the process of physically separating chemical components into a vapor phase and a liquid phase based on differences in the components' boiling points and vapor pressures at specified temperatures and pressures. Distillation is typically performed in a "distillation column," which includes a series of vertically spaced plates. A feed stream enters the distillation column at a mid-point, dividing the distillation column into two sections. The top section may be referred to as the rectification section, and the bottom section may be referred to as the stripping section. Condensation and vaporization occur on each plate, causing lower boiling point components to rise to the top of the distillation column and higher boiling point components to fall to the bottom. A re-boiler is located at the base of the distillation column to add thermal energy. The "bottoms" product is removed from the base of the distillation column. A condenser is located at the top of the distillation column to condense the product emanating from the top of the distillation column, which is called the distillate. A reflux pump is used to maintain flow in the rectification section of the distillation column by pumping a portion of the distillate back into the distillation column.

As used herein, the term "fluid" refers to gases, liquids, and combinations of gases and liquids, as well as to combinations of gases and solids, and combinations of liquids and solids.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as $CH_4$, $C_2H_2$, $C_2H_4$, $C_2H_6$, $C_3$ isomers, $C_4$ isomers, benzene, and the like.

With respect to fluid processing equipment, the term "in series" means that two or more devices are placed along a flow line such that a fluid stream undergoing fluid separation moves from one item of equipment to the next while maintaining flow in a substantially constant downstream direction. Similarly, the term "in line" means that two or more components of a fluid mixing and separating device are connected sequentially or, more preferably, are integrated into a single tubular device.

As used herein, the terms "lean" and "rich," when used with respect to the absorbent liquid removal of a selected gas component from a gas stream, are relative, merely implying, respectively, a lesser or greater degree or extent of loading or content of the selected gas component, and do not necessarily indicate or require, respectively, either that the absorbent liquid is totally devoid of the selected gas component, or that it is incapable of absorbing more of the selected gas component. In fact, it is preferred that the so-called "rich" absorbent liquid retains residual absorptive capacity. Conversely, a "lean" absorbent liquid will be understood to be capable of additional absorption, and may retain a minor concentration of gas components being removed.

As used herein, the term "liquid desiccant" refers to any type of glycol or other absorbent liquid that is capable of absorbing water from a gas stream.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), acid gases (e.g., carbon dioxide or hydrogen sulfide), or any combinations thereof. The natural gas can also contain minor amounts of contaminants such as water, nitrogen, iron sulfide, wax, crude oil, or any combinations thereof. The natural gas stream may be substantially purified prior to use in embodiments described herein, so as to remove compounds that may act as poisons.

"Non-absorbing gas" means a gas that is not significantly absorbed by an absorbent liquid during a gas treating or conditioning process.

As used herein, "purification" includes separation processes by which impurities that may cause problems to downstream processes may be removed. The separation processes may include any number of processes known in the art, such as dehydration, distillation, controlled oxidation of impurities, cold box separation, cryogenic separations, and the like.

As used herein, the term "stripping" refers to a physical separation process by which one or more components are removed from a liquid stream by a vapor stream, referred to as a "stripping gas." Stripping is typically performed at the highest practical temperature and the lowest practical pressure. This allows for the lowest possible stripping gas flow rate.

Overview

The present techniques provide for the regeneration of liquid desiccant using one or more co-current contacting systems. More specifically, the present techniques provide for the removal of water from a natural gas stream using liquid desiccant within a gas dehydrator, and the regeneration of the liquid desiccant within a desiccant regenerator. In various embodiments, the gas dehydrator and the desiccant regenerator are included within a gas processing system. Moreover, the gas dehydrator and the desiccant regenerator each include one or more co-current contacting systems. The use of co-current contacting systems in place of conventional counter-current contactors provides various benefits, including increasing the efficiency and reducing the cost of the gas processing system, as described further with respect to FIGS. 1, 2A, and 2B.

Conventional Gas Processing System

FIG. 1 is a process flow diagram of a conventional gas processing system 100 that employs the Drizo™ process for desiccant regeneration. The conventional gas processing system 100 is used to remove water from a natural gas stream 102, generating a final dehydrated natural gas stream 103. This is accomplished by flowing the natural gas stream 102 into a contactor 106, which removes the water from the natural gas stream 102. The dehydrated natural gas stream 104 is then flowed out of the contactor 106 as an overhead stream. In addition, residual water and acid gas components are removed in connection with a subsequent process, as discussed further herein.

In various embodiments, the natural gas stream 102 is a raw natural gas stream obtained from a subsurface reservoir 108 via any suitable type of hydrocarbon recovery operation. The natural gas stream 102 may include a non-absorbing gas, such as methane. In addition, according to embodiments described herein, the natural gas stream 102 includes water and other impurities, such as acid gases.

As shown in FIG. 1, the natural gas stream 102 is flowed into an inlet separator 110 upon entry into the conventional gas processing system 100. When entering the inlet separator 110, the natural gas stream 102 may be under a large amount of pressure. However, the pressure of the natural gas stream 102 may vary considerably, depending on the characteristics of the subsurface reservoir 108 from which the gas product is produced. For example, the pressure of the natural gas stream 102 may range between atmospheric pressure and several thousand psig. For natural gas treating applications, the pressure of the natural gas stream 102 may be boosted to about 689 kPA (100 psia), or about 3447 kPa (500 psia), or greater, if desired.

The inlet separator 110 cleans the natural gas stream 102, for example, to prevent foaming of liquid desiccant during the dehydration process. This is accomplished by separating the natural gas stream 102 into liquid-phase components and gas-phase components. The liquid-phase components include heavy hydrocarbons, water, and impurities such as brine and drilling fluids. Such components are flowed out of the inlet separator 110 via a bottoms line 114, and are sent to an oil recovery system 116. The gas-phase components include natural gas and some amount of impurities, such as water and acid gases. Such components are flowed out of the inlet separator 110 as the overhead natural gas stream 112.

From the inlet separator 110, the overhead natural gas stream 112 is flowed into the contactor 106. The contactor 106 uses a lean desiccant stream 118 to absorb water in the natural gas stream 112.

The lean desiccant stream 118 is stored in a tank 120. A pump 122 forces the lean desiccant stream 118 from the tank 120 into the contactor 106 under suitable pressure. For example, the pump 122 may boost the pressure of the lean desiccant stream 118 to about 6.89 MPa (1,000 psia) or higher, depending on the pressure of the natural gas stream 102.

Once inside the contactor 106, gas within the natural gas stream 112 moves upward through the contactor 106. Typically, packing 124, trays, or other internal structures, are provided within the contactor 106 to create indirect flow paths for the natural gas stream 112 and to create interfacial area between the gas and liquid phases. At the same time, the liquid from the lean desiccant stream 118 moves downward and through the packing 124 in the contactor 106. The packing 124 aids in the interaction of the natural gas stream 112 with the lean desiccant stream 118.

The contactor 106 operates on the basis of a counter-current flow scheme. In other words, the natural gas stream 112 is directed through the contactor 106 in one direction, while the lean desiccant stream 118 is directed through the contactor 106 in the opposite direction. As the two fluid materials interact, the down-flowing lean desiccant stream 118 absorbs water from the up-flowing natural gas stream 112 to produce the dehydrated natural gas stream 104.

Upon exiting the contactor 106, the dehydrated natural gas stream 104 is flowed through an outlet separator 126. The outlet separator 126, also referred to as a scrubber, allows any liquid desiccant carried over from the contactor 106 to fall out of the dehydrated natural gas stream 104. The final dehydrated natural gas stream 103 is flowed out of the outlet separator 126 via an overhead line 130. Any residual liquid desiccant 132 drops out through a bottoms line 134.

A rich desiccant stream 136 flows from the bottom of the contactor 106. The rich desiccant stream 136 is a desiccant solution that is rich in the absorbed water. The rich desiccant stream 136 may be at a relatively high temperature, such as about 32.2° C. (90° F.) to about 38.9° C. (102° F.), or higher. In various embodiments, the conventional gas processing system 100 includes equipment for regenerating the lean desiccant stream 118 from the rich desiccant stream 136, as discussed further herein.

A regenerator 138 is used to regenerate the lean desiccant stream 118 from the rich desiccant stream 136. The regenerator 138 includes a reboiler 140 that is coupled to a distillation column 142. Heat may be provided to the reboiler 140 by a direct fired heater or a hot oil system, for example. The regenerator 138 may be a large pressure vessel, or interconnected series of pressure vessels, that operates at about 48.3 kPa (7 psia) to about 206.8 kPa (30 psia), for example.

From the contactor 106, the rich desiccant stream 136 is flowed through a tube bundle 146 in the top of the distillation column 142. High-temperature water vapor and off-gases 148 being released from the distillation column 142 preheat the rich desiccant stream 136 as it flows through the tube bundle 146, before the water vapor and off-gases 148 are released from the distillation column 142. According to the embodiment shown in FIG. 1, the water vapor and off-gases 148 also contain a stripping gas 150 that is recirculated to the regenerator 138 to enhance the regeneration process, as described further herein.

After being preheated within the distillation column 142, the rich desiccant stream 136 is released from the tube bundle 146 as a warmed desiccant stream 152. The warmed desiccant stream 152 is flowed into a flash drum 154. Residual gases 156, such as acid gases and methane, are flashed out of the flash drum 154 via an overhead line 158.

In addition, any entrained heavier hydrocarbons, such as ethane or propane, within the warmed desiccant stream 152 are captured within the flash drum 154. The resulting hydrocarbon stream 160 is flowed out of the flash drum 154 via a bottoms line 162.

Further, as the temperature and pressure of the desiccant stream 152 drops within the flash drum 154, the hydrocarbons within the desiccant stream 152 are separated out, producing a partially-purified desiccant stream 164. The partially-purified desiccant stream 164 is then released from the flash drum 154. The partially-purified desiccant stream 164 is flowed through a filter 166, such as a carbon filter, for particle filtration.

The resulting filtered desiccant stream 168 is then flowed through a heat exchanger 170. Within the heat exchanger 170, the filtered desiccant stream 168 is heated via heat exchange with the lean desiccant stream 118. The resulting high-temperature desiccant stream 172 is flowed into the distillation column 142 of the regenerator 138. As the high-temperature desiccant stream 172 travels through the distillation column 142, the water vapor and off-gases 148 are removed from the high-temperature desiccant stream 172.

The high-temperature desiccant stream 172 is flowed out of the bottom of the distillation column 142 and into the reboiler 140. The reboiler 140 further increases the temperature of the desiccant stream 172. In addition, the reboiler 140 boils off residual water vapor and off-gases 148 from the high-temperature desiccant stream 172. The components that are boiled off travels upward through the distillation column 142 and become the water vapor and off-gases 148 that are released from the distillation column 142.

The regenerator 138 also includes a separate stripping section 174. According to the embodiment shown in FIG. 1, the stripping gas 150 is fed into the stripping section 174 of the regenerator 138 as part of a Drizo™ process loop. More specifically, according to the Drizo™ process loop, the water vapor and off-gases 148 being released from the distillation column 142 are flowed through a condenser 176, which condenses the water and the stripping gas within the water vapor and off-gases 148. A three-phase separator 178 then separates the resulting condensed stream 180 into water 182, off-gases 184, and a condensed stripping gas 186. The water 182 and off-gases 184 are removed from the process, while the condensed stripping gas 186 is flowed through a pump 187, which increases the pressure of the condensed stripping gas 186. The condensed stripping gas 186 is then flowed into a heater 188. The heater 188 vaporizes the condensed stripping gas 186, generating the stripping gas 150. The stripping gas 150 may include aromatics, such as benzene, toluene, ethyl-benzene, and xylene (referred to collectively as "BTEX"), or may comprise isomers of $C_7$ or $C_8$ alkanes, such as iso-octane.

The stripping gas 150 is then introduced into the stripping section 174 of the regenerator 138. The stripping section 174 includes packing or other internals that promote further distillation of the high-temperature desiccant stream 172. Any remaining impurities, such as water, within the high-temperature desiccant stream 172 are "stripped" with the aid of the stripping gas 150 and join the water vapor and off-gases 148 being released from the distillation column 142. The desiccant stream 172 is then flowed into a surge tank 190, from which it is released as the lean desiccant stream 118.

The regenerated lean desiccant stream 118 is pumped out of the surge tank 190 via a pump 192. The pump 192 may increase the pressure of the lean desiccant stream 118 to about 241.3 kPa (35 psia) to about 344.7 kPa (50 psia), for example.

The lean desiccant stream 118 is then flowed through the heat exchanger 170. Heat exchanged with the filtered desiccant stream 168 in the heat exchanger 170 serves to partially cool the lean desiccant stream 118. In addition, the lean desiccant stream 118 is flowed through a cooler 194 prior to being returned to the contactor 106. The cooler 194 cools the lean desiccant stream 118 to allow dehydration to a lower dewpoint. For example, the cooler 194 may chill the lean desiccant stream 118 to around 37.8° C. (100° F.) to 51.7° C. (125° F.).

As described above, the conventional gas processing system 100 includes two large pieces of equipment that utilize a counter-current flow scheme, the contactor 106 and the regenerator 138. As a result, comparatively low velocities are required to avoid entrainment of the downflowing liquid streams in the gas streams. Moreover, depending on the flow rate of the gas streams, the contactor 106 may be around 4.6 meters (15 feet) in diameter and around 15.2 m (50 feet) tall, while the regenerator 138 may be around 1.5 m (5 feet) in diameter and around 9.1 m (30 feet) tall. For high-pressure applications, the vessels have thick, metal walls; for subsea applications, those walls must be even thicker to withstand the high external pressures present on the sea floor. Consequently, counter-current contactor vessels can be large and very heavy. This is expensive and undesirable, particularly for offshore and/or subsea oil and gas recovery applications.

In addition, the internals of the contactor 106 and the regenerator 138 can make them susceptible to wave motion in an offshore environment. Therefore, it may be desirable to have a mass transfer process that does not rely on conventional tower internals.

Embodiments described herein utilize a co-current flow scheme as an alternative to the counter-current flow scheme demonstrated in the contactor 106 and the regenerator 138 of FIG. 1. Specifically, embodiments described herein utilize one or more co-current contacting systems for both the gas dehydration process and the desiccant regeneration process. A gas stream and a liquid stream move together, i.e., co-currently, within the co-current contacting systems. In some embodiments, the gas stream and the liquid stream move together generally along the longitudinal axis of the respective co-current contacting system. In general, co-current contactors are not subject to the same hydraulic capacity limitations as counter-current contactors. As a result, co-current contactors tend to be smaller than counter-current contactors that utilize standard packed or trayed towers.

Gas Processing System with a Co-Current Flow Scheme

Figure 2A:
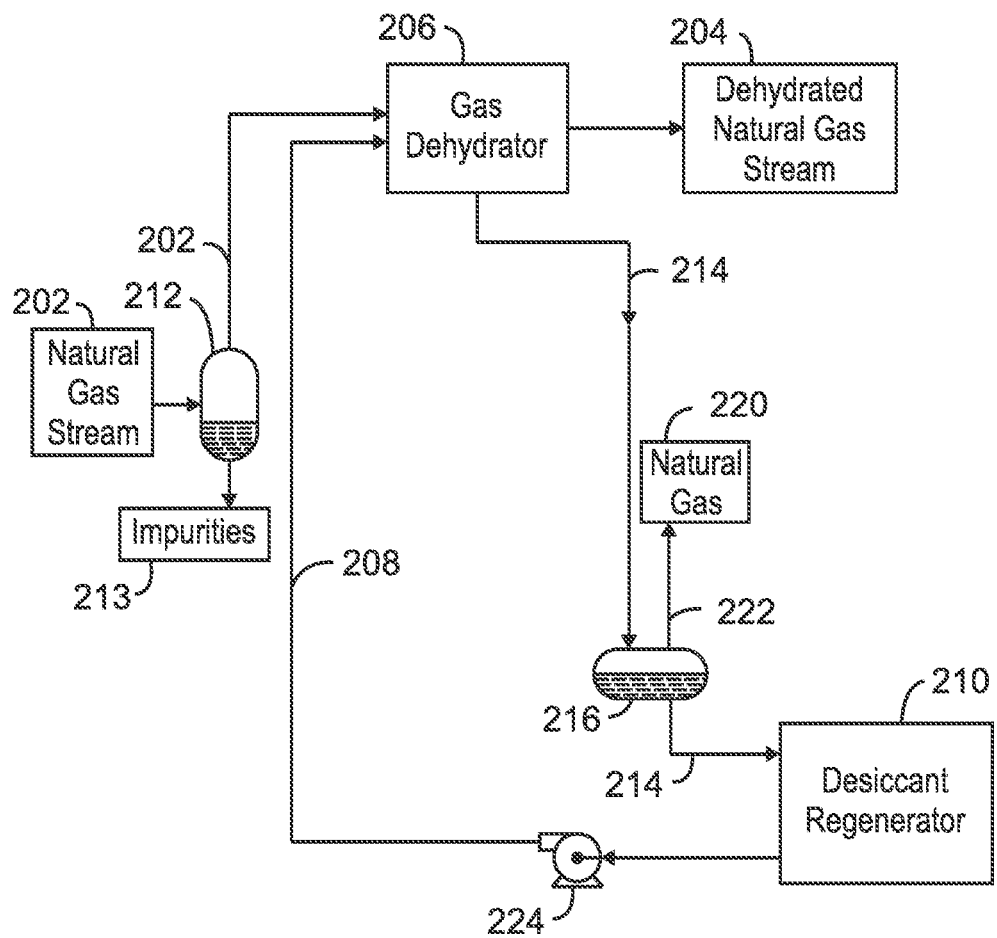
FIG. 2A is a simplified process flow diagram of a gas processing system that includes a co-current flow scheme for gas dehydration and desiccant regeneration.

FIG. 2A is a simplified process flow diagram of a gas processing system 200 that includes a co-current flow scheme for gas dehydration and desiccant regeneration. The gas processing system 200 may be an alternative to the conventional gas processing system 100 discussed with respect to FIG. 1. The gas processing system 200 may be used to dehydrate a natural gas stream 202 by removing water from the natural gas stream 202.

In some embodiments, the natural gas stream 202 is a raw natural gas stream from a hydrocarbon production operation. The natural gas stream 202 includes a non-absorbing gas, such as methane, and impurities, such as water. The gas processing system 200 converts the natural gas stream 202 into a dehydrated natural gas stream 204 by removing the water.

In operation, the natural gas stream 202 is flowed into a gas dehydrator 206, where it is mixed with a lean desiccant stream 208. The lean desiccant stream 208 may include any absorbent liquid that is capable of removing water from the natural gas stream 202. For example, in various embodiments, the lean desiccant stream 208 is a liquid glycol stream, such as, for example, triethyleneglycol (TEG), monoethyleneglycol (MEG), diethyleneglycol (DEG), or tetraethyleneglycol (T4EG). Moreover, according to embodiments described herein, the lean desiccant stream 208 is a desiccant stream that has undergone a regeneration, or desorption, process for the removal of water. This is accomplished using a desiccant regenerator 210, as described further herein.

Before entering the gas dehydrator 206, the natural gas stream 202 passes through an inlet separator 212. The inlet separator 212 cleans the natural gas stream 202 by filtering out impurities 213, such as brine and drilling fluids. Some particle filtration may also take place. The cleaning of the natural gas stream 202 helps to prevent foaming of the liquid desiccant stream 208 during the dehydration process.

According to embodiments described herein, the natural gas stream 202 and the liquid desiccant stream 208 are co-currently flowed into the gas dehydrator 206. Within the gas dehydrator 206, the liquid desiccant stream 208 removes the water from the natural gas stream 202, producing a rich desiccant stream 214 and the dehydrated natural gas stream 204. This dehydration process is accomplished using one or more co-current contacting systems, as described further with respect to FIG. 2B.

The rich desiccant stream 214 is then flowed through a flash drum 216 to begin the regeneration process. Within the flash drum 216, absorbed natural gas 220 is flashed from the rich desiccant stream 214. The absorbed natural gas 220 is flowed out of the flash drum 216 via an overhead line 222.

The rich desiccant stream 214 is then sent to the desiccant regenerator 210. According to embodiments described herein, the rich desiccant stream 214 is co-currently contacted with a circulating stripping gas (not shown) within the desiccant regenerator 210. The stripping gas removes the water from the rich desiccant stream 214, regenerating the lean desiccant stream 208. This regeneration process is accomplished using one or more co-current contacting systems, as described further with respect to FIGS. 2B and 3A-C.

The lean desiccant stream 208 is then recycled to the gas dehydrator 206. In various embodiments, movement of the lean desiccant stream 208 from the desiccant regenerator 210 to the gas dehydrator 206 is aided by a pump 224.

The process flow diagram of FIG. 2A is not intended to indicate that the gas processing system 200 is to include all of the components shown in FIG. 2A. Further, any number of additional components may be included within the gas processing system 200. One particular embodiment of the gas processing system 200 is described in more detail with respect to FIG. 2B.

Figure 2B:
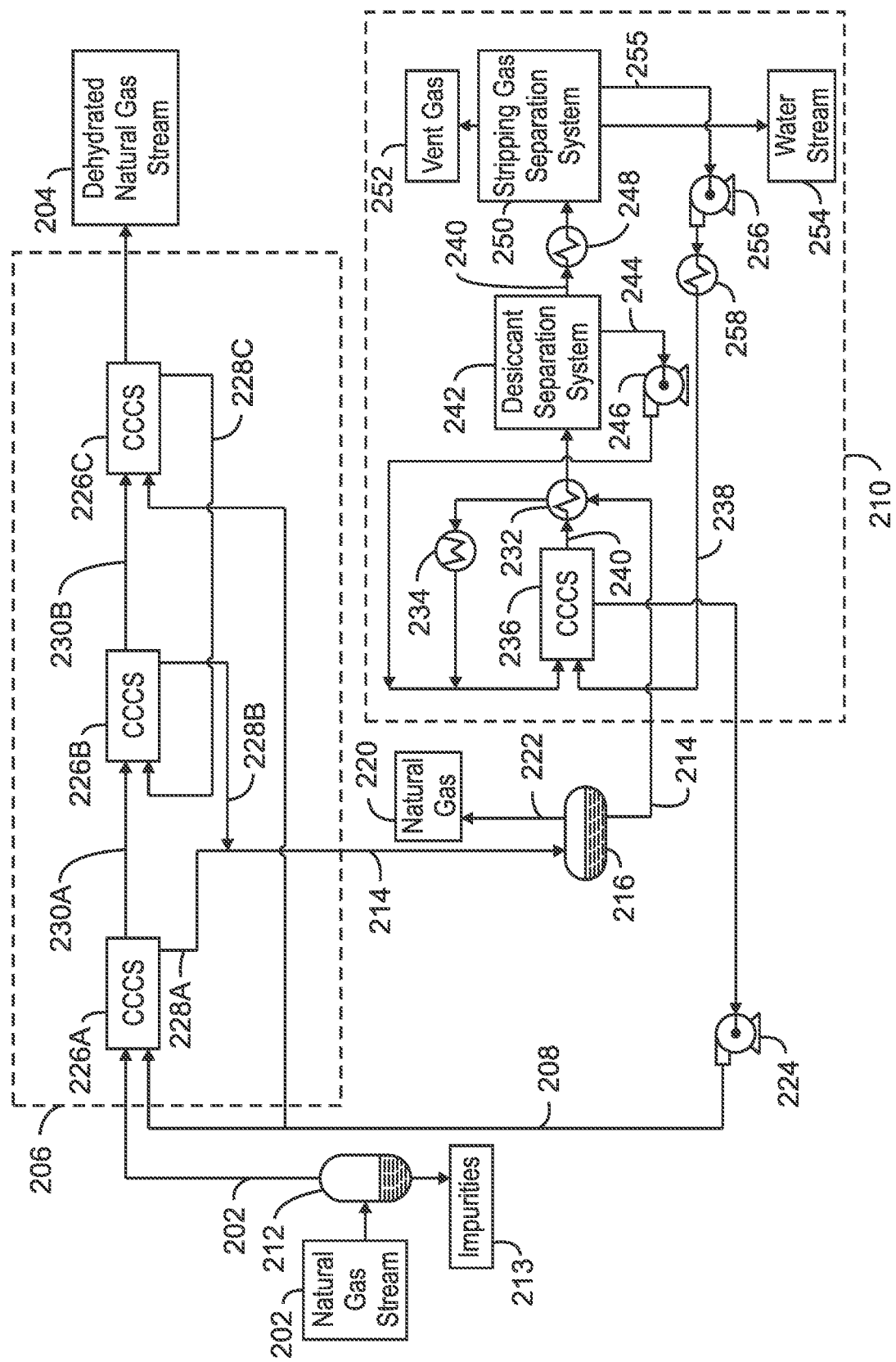
FIG. 2B is a process flow diagram showing one exemplary embodiment of the gas processing system described with respect to FIG. 2A.

FIG. 2B is a process flow diagram showing one exemplary embodiment of the gas processing system 200 described with respect to FIG. 2A. Like numbered items are as described with respect to FIG. 2A. According to the embodiment shown in FIG. 2B, the gas dehydrator 206 includes three co-current contacting systems 226A-C. Each co-current contacting system 226A, 226B, and 226C includes a co-current contactor (not shown) and a separator (not shown), as described further with respect to FIGS. 3A-C, 4, and 5A-D.

As shown in FIG. 2B, the natural gas stream 202 and the liquid desiccant stream 208 are co-currently flowed into the first co-current contacting system 226A within the gas dehydrator 206. Once inside the first co-current contacting system 226A, the natural gas stream 202 and the liquid desiccant stream 208 move along the longitudinal axis of the first co-current contacting system 226A. As they travel, the liquid desiccant stream 208 interacts with the water in the natural gas stream 202, causing the water to be absorbed by the desiccant. A first partially-loaded, or "rich," desiccant stream 228A is flowed out of the first co-current contacting system 226A. In addition, a first partially-dehydrated natural gas stream 230A is flowed out of the first co-current contacting system 226A and into a second co-current contacting system 226B.

The second co-current contacting system 226B produces a second partially-loaded desiccant stream 228B and a second partially-dehydrated natural gas stream 230B. According to the embodiment shown FIG. 2B, the second partially-loaded desiccant stream 228B merges with the first partially-loaded desiccant stream 228A to form the rich desiccant stream 214 that is sent through the flash drum 216 and into the desiccant regenerator 210.

As shown in FIG. 2B, a third co-current contacting system 226C is provided after the second co-current contacting system 226B. The third co-current contacting system 226C produces a third partially-loaded desiccant stream 228C and the final dehydrated natural gas stream 204. According to the embodiment shown in FIG. 2B, the third partially-loaded desiccant stream 228C is recycled and used as the desiccant stream entering the second co-current contacting system 226B. In addition, the desiccant stream entering the third co-current contacting system 226C is a portion of the lean desiccant stream 208 exiting the desiccant regenerator 210.

As described with respect to FIG. 2A, the rich desiccant stream 214 is then flowed through the flash drum 216 to begin the regeneration process. From the flash drum 216, the rich desiccant stream 214 is flowed through a cross exchanger 232 and a heater 234 within the desiccant regenerator 210. The cross exchanger 232 and the heater 234 increase the temperature of the rich desiccant stream 214 from about 37.8° C. (100° F.) to about 121° C. (250° F.) to 204° C. (400° F.). In various embodiments, the temperature to which the rich desiccant stream 214 is heated is dependent on the type of desiccant being used. For example, if glycol is being used as the desiccant within the gas processing system 200, the cross exchanger 232 and the heater 234 may heat the rich desiccant stream 214 to any temperature that does not exceed the glycol decomposition temperature. As an example, the decomposition temperature of triethylene glycol is approximately 207° C. (404° F.), and the decomposition temperature of diethylene glycol is approximately 164° C. (328° F.).

From the heater 234, the rich desiccant stream 214 is flowed into a fourth co-current contacting system 236 within the desiccant regenerator 210. Once inside the fourth co-current contacting system 236, the rich desiccant stream 214 is co-currently contacted with a circulating stripping gas 238. Specifically, the rich desiccant stream 214 and the stripping gas 238 move along the longitudinal axis of the fourth co-current contacting system 236. As they travel, the stripping gas 238 interacts with the water in the rich desiccant stream 214, causing the water to be entrained within the stripping gas 238. The resulting lean desiccant stream 208 is flowed out of the fourth co-current contacting system 236 and is recycled for reuse in the gas dehydrator 206. In addition, the resulting wet stripping gas 240 is flowed out of the fourth co-current contacting system 236 and through the cross exchanger 232, in which it is cooled to about 49-121° C. (120-250° F.) via heat exchange with the rich desiccant stream 214.

The wet stripping gas 240 is then flowed into a desiccant separation system 242. The desiccant separation system 242 removes any entrained desiccant from the wet stripping gas 240. The resulting residual desiccant stream 244 is then flowed out of the desiccant separation system 242 and is combined with the rich desiccant stream 214 before it enters the fourth co-current contacting system 236. Movement of the residual desiccant stream 244 from the desiccant separation system 242 to the fourth co-current contacting system 236 may be aided by a second pump 246.

The wet stripping gas 240 exiting the desiccant separation system 242 is then flowed through a cooler 248, which cools the wet stripping gas 240 to about 37.8° C. (100° F.), for example, and into a stripping gas separation system 250. The stripping gas separation system 250 removes the water and other impurities from the wet stripping gas 240, producing a vent gas 252, a water stream 254, and a condensed stripping gas 255. The condensed stripping gas 255 is then flowed through a third pump 256, which increases the pressure of the condensed stripping gas 255. The condensed stripping gas 255 is also flowed through a vaporizer 258, regenerating the stripping gas 238. The stripping gas 238 is then recirculated into the fourth co-current contacting system 236 to continue the desiccant regeneration process. In various embodiments, the vaporizer 258 ensures that the stripping gas 238 enters the fourth co-current contacting system 236 at a suitable temperature of about 149-204° C. (300-400° F.).

According to embodiments described herein, the stripping gas 238 may include any gas which is capable of removing, or "stripping," the water from the rich desiccant stream 214. For example, in some embodiments, the stripping gas 238 includes one or more aromatics, such as benzene, toluene, ethyl-benzene, and xylene (referred to collectively as "BTEX"), or may comprise isomers of $C_7$ or $C_8$ alkanes, such as iso-octane.

The process flow diagram of FIG. 2B is not intended to indicate that the gas processing system 200 is to include all of the components shown in FIG. 2B. Further, any number of additional components may be included within the gas processing system 200, depending on the details of the specific implementation. For example, the gas processing system 200 may include any suitable types of heaters, chillers, condensers, liquid pumps, gas compressors, blowers, bypass lines, other types of separation and/or fractionation equipment, valves, switches, controllers, pressure-measuring devices, temperature-measuring devices, level-measuring devices, or flow-measuring devices, among others. Moreover, the components within the gas processing system 200 may be arranged in any suitable configuration. For example, according to the embodiment shown in FIG. 2B, the components of the gas dehydrator 206 and the desiccant regenerator 210 are configured in series. However, in other embodiments, those components may be configured in parallel.

In some embodiments, the stripping gas separation system 250 is a three-phase separator. However, the stripping gas separation system 250 may also include any other suitable separation system. For example, when the gas processing system 200 is implemented in a subsea environment, the stripping gas separation system 250 may include a harp separator, pipe separator, or slug catcher that is capable of removing the water and other impurities from the wet stripping gas 240, producing the vent gas 252, the water stream 254, and the condensed stripping gas 255.

While three co-current contacting systems 226A-C are shown within the gas dehydrator 206 of FIG. 2B, it is to be understood that any number of co-current contacting systems may be included within the gas dehydrator 206. Moreover, while inter-stage recycling of the third partially-loaded desiccant stream 228C into the second co-current contacting system 226B is shown in FIG. 2B, it is to be understood that the gas dehydrator 206 may be configured in any suitable manner to accommodate both inter-stage and intra-stage desiccant recycling. For example, the second partially-loaded desiccant streams 228B may also be recycled to the first co-current contacting system 226A via inter-stage recycling. In addition, for example, a portion of the second partially-loaded desiccant stream 228B may be recycled into the second co-current contacting system 226B via intra-stage recycling.

Similarly, while only one co-current contacting system 236 is shown within the desiccant regenerator 210 of FIG. 2B, it is to be understood that any number of co-current contacting systems may be included within the desiccant regenerator 210. Moreover, in embodiments in which multiple co-current contacting systems are included within the desiccant regenerator 210, inter-stage and/or intra-stage recycling may be employed in any suitable manner.

When the gas processing system 200 is implemented within a subsea environment, any suitable components may be added to the gas processing system 200 to provide for efficient disposal of the water stream 254 and/or the vent gas 252 at the subsea level. As an example, the water stream 254 may be reinjected into the subsurface reservoir. As another example, the water stream 254 and/or the vent gas 252 may be pumped back into the gas processing system 200 using a small compressor or an eductor system that utilizes a slip-stream of the wet stripping gas 240 as a motive fluid. In various embodiments, disposing of the water stream 254 and the vent gas 252 at the subsea level reduces the number of tie-backs to the surface facility, resulting in significant cost savings.

In various embodiments, using the circulating stripping gas 238 within the desiccant regenerator 210 artificially increases the vapor traffic in the overall desiccant regenerator 210, enabling the compact, co-current flow scheme to be used. This increases the operability and efficiency of the gas processing system 200, especially in a subsea environment. In addition, in various embodiments, using the circulating stripping gas 238 within the desiccant regenerator 210 reduces the heating requirements for desiccant regeneration, as well as the circulation rate of the desiccant stream within the gas processing system 200. Such improvements translate to a significant reduction in operating costs as compared to conventional counter-current alternatives.

Desiccant Regeneration Systems with Co-Current Flow Schemes

Figure 3A:
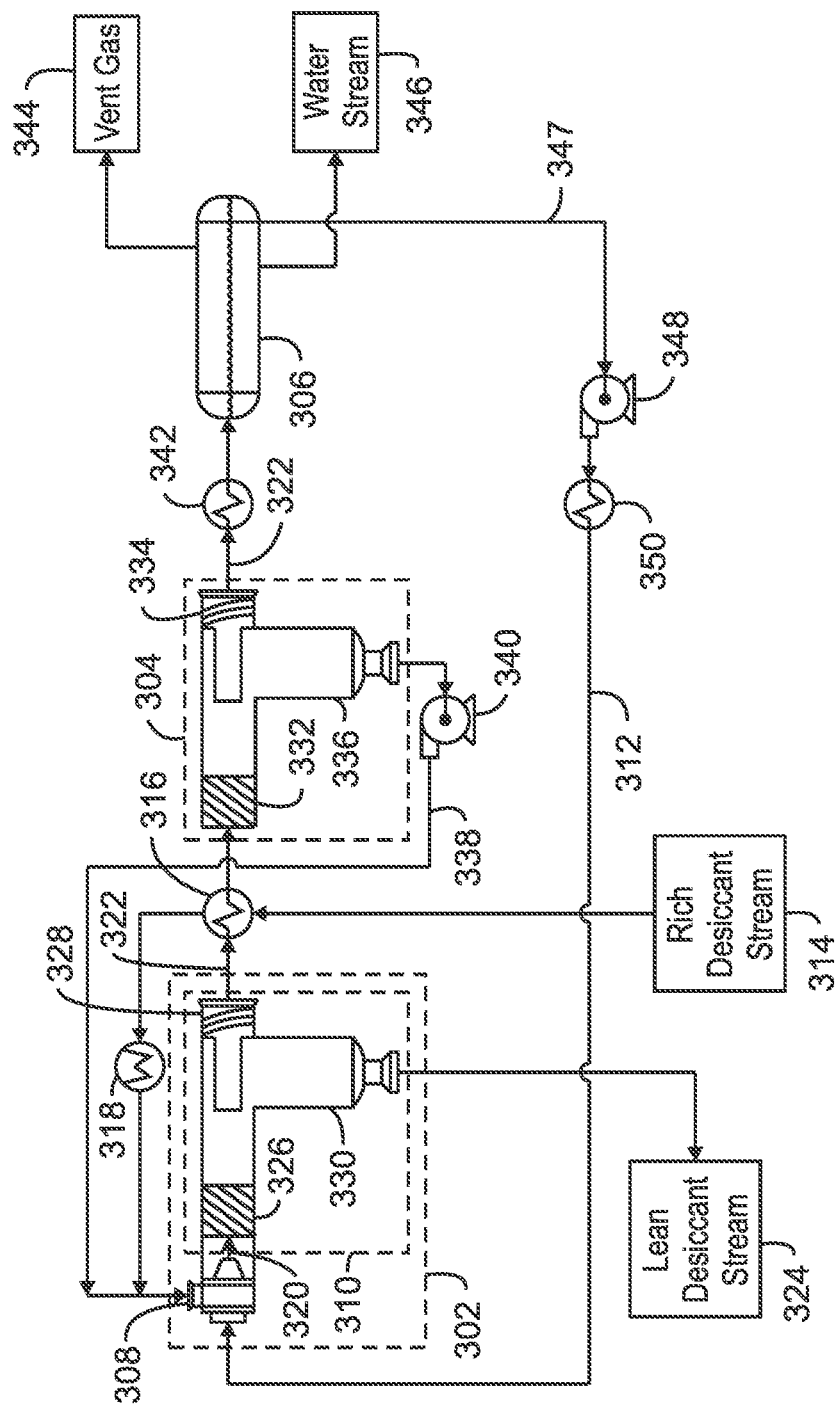
FIG. 3A is a process flow diagram of a desiccant regenerator that includes a co-current flow scheme.

FIG. 3A is a process flow diagram of a desiccant regenerator 300 that includes a co-current flow scheme. In various embodiments, the desiccant regenerator 300 of FIG. 3A is a more detailed view of the desiccant regenerator 210 of FIG. 2B. The desiccant regenerator 300 includes a co-current contacting system 302, a second separation system 304, and a three-phase separator 306.

The co-current contacting system 302 includes a co-current contactor 308 and a first separation system 310. The co-current contactor 308 includes a number of components (not shown) that provide for the efficient contacting of a circulating stripping gas 312 with a liquid droplet stream (not shown) formed from a rich desiccant stream 314. According to embodiments described herein, the liquid droplet stream includes water absorbed from a natural gas stream, and the stripping gas 312 is used to separate the water from the liquid droplet stream.

In various embodiments, the rich desiccant stream 314 is flowed through a cross exchanger 316 and a heater 318 within the desiccant regenerator 300. The cross exchanger 316 and the heater 318 increase the temperature of the rich desiccant stream 314 from about 37.8° C. (100° F.) to about 121 to 204° C. (250 to 400° F.). In various embodiments, the temperature to which the rich desiccant stream 314 is heated is dependent on the type of desiccant being used. For example, if glycol is being used as the desiccant within the desiccant regenerator 300, the cross exchanger 316 and the heater 318 may heat the rich desiccant stream 314 to any temperature that does not exceed the glycol decomposition temperature. As an example, the decomposition temperature of triethylene glycol is approximately 207° C. (404° F.), and the decomposition temperature of diethylene glycol is approximately 164° C. (328° F.).

From the heater 318, the rich desiccant stream 314 is flowed into the co-current contactor 308, for example, into a hollow space (not shown) coupled to flow channels (not shown) in the co-current contactor 308. The stripping gas 312 is also flowed into the co-current contactor 308. The stripping gas 312 may include any gas which is capable of removing, or "stripping," the water from the rich desiccant stream 314. For example, in some embodiments, the stripping gas 312 includes one or more aromatics, such as benzene, toluene, ethyl-benzene, and xylene (referred to collectively as "BTEX"), or may comprise isomers of $C_7$ or $C_8$ alkanes, such as iso-octane.

From the flow channels, the rich desiccant stream 314 is released into the stripping gas 312 as fine droplets through injection orifices (not shown), resulting in a treated gas stream 320. The treated gas stream 320 may include small liquid droplets dispersed in a gas phase. The liquid droplets may include water from the rich desiccant stream 314 that were entrained within the stripping gas 312.

The treated gas stream 320 is then flowed into the first separation system 310. The first separation system 310 removes the liquid phase from the gas phase, producing a wet stripping gas 322 including the absorbed water and a lean desiccant stream 324. In some embodiments, the lean desiccant stream 324 is then recycled to an upstream gas dehydration system (not shown).

According to the embodiment shown in FIG. 3A, the first separation system 310 includes a first swirl element 326, a first anti-swirl element 328, and a first liquid collection boot 330. The first swirl element 326 imparts cyclonic motion to the fluids within the first separation system 310. This causes the small liquid droplets to coalesce into larger droplets. The heavier liquid droplets then flow along the wall of the first separation system 310, while the gas phase flows along the center of the first separation system 310. The first anti-swirl element 328 then straightens the flow of the gas phase, while the first liquid collection boot 330 allows the liquid droplets to flow out of the co-current contacting system 302 as the lean desiccant stream 324.

The wet stripping gas 322 is flowed out of the co-current contacting system 302 and through the cross exchanger 316, in which it is cooled to about 49-121° C. (120-250° F.) via heat exchange with the rich desiccant stream 314. The wet stripping gas 322 is then flowed into the second separation system 304. The second separation system 304 includes a second swirl element 332, a second anti-swirl element 334, and a second liquid collection boot 336. The second swirl element 332 imparts cyclonic motion to any entrained liquid desiccant within the wet stripping gas 322. The heavier liquid desiccant then flows along the wall of the second separation system 304, while the gas phase flows along the center of the second separation system 304. The second anti-swirl element 334 then straightens the flow of the gas phase, while the second liquid collection boot 336 allows the liquid desiccant to flow out of the second separation system 304 as a residual desiccant stream 338. The residual desiccant stream 338 is then combined with the rich desiccant stream 314 upstream of the co-current contacting system 302. Movement of the residual desiccant stream 338 from the second separation system 304 to the co-current contacting system 302 is aided by a first pump 340. The first pump 340 may cause the residual desiccant stream 338 to flow into the co-current contacting system 302 at a suitable pressure, for example, of about 103.4 kPa (15 psia) to about 344.7 kPa (50 psia).

The wet stripping gas 322 exiting the second separation system 304 is then flowed through a cooler 342, which cools the wet stripping gas 322 to a suitable temperature of about 37.8° C. (100° F.), for example, and into the three-phase separator 306. The three-phase separator 306 removes the water and other impurities from the wet stripping gas 322, producing a vent gas 344, a water stream 346, and a condensed stripping gas 347. The condensed stripping gas 347 is then flowed through a second pump 348, which increase the pressure of the condensed stripping gas 347. The condensed stripping gas 347 is also flowed through a vaporizer 350, which vaporizes the condensed stripping gas 347, regenerating the stripping gas 312. The stripping gas 312 is then recirculated into the first co-current contacting system 302 to continue the desiccant regeneration process. In various embodiments, the vaporizer 350 causes the stripping gas 312 to flow into the co-current contacting system 302 at a suitable temperature of about 149-204° C. (300-400° F.), for example.

The process flow diagram of FIG. 3A is not intended to indicate that the desiccant regenerator 300 is to include all of the components shown in FIG. 3A. In addition, any number of additional components may be included within the desiccant regenerator 300, depending on the details of the specific implementation. Moreover, any of the components within the desiccant regenerator 300 may be replaced with any other suitable components that perform the same or similar functions. For example, the cross exchanger 316 and the heater 318 may include any suitable types of heating devices, or may be combined into a single heating device. Moreover, the cooler 342 may include any suitable type of cooling device. Furthermore, according to embodiments described herein, the second separation system 304 may be generally referred to as a "desiccant separation system," and the three-phase separator 306 may be generally referred to as a "stripping gas separation system," as described with respect to FIG. 2B.

The desiccant regenerator 300 of FIG. 3A is an exemplary desiccant regenerator in which the stripping gas and thermal regeneration zones are combined. However, another exemplary desiccant regenerator may include distinct stripping gas and thermal regeneration zones, as described with respect to FIG. 3B.

Figure 3B:
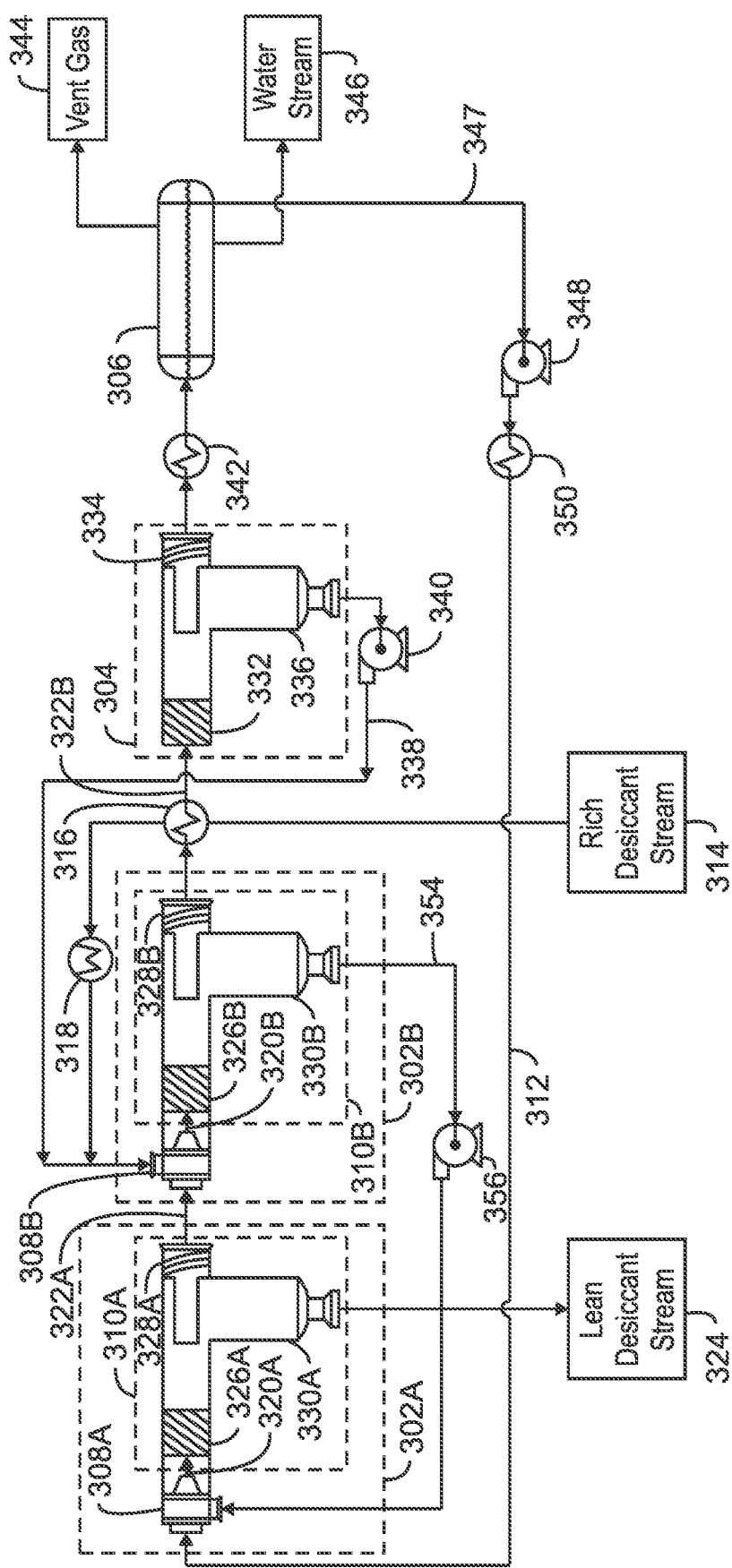
FIG. 3B is a process flow diagram of another desiccant regenerator that includes a co-current flow scheme.

FIG. 3B is a process flow diagram of another desiccant regenerator 352 that includes a co-current flow scheme Like numbered items are as described with respect to FIG. 3A. The desiccant regenerator 352 of FIG. 3B is similar to the desiccant regenerator 300 of FIG. 3A, except the desiccant regenerator 352 of FIG. 3B includes a first co-current contacting system 302A that constitutes a stripping gas zone and a second co-current contacting system 302B that constitutes a thermal regeneration zone. Specifically, within the first co-current contacting system 302A, the stripping gas 312 is contacted with a semi-lean desiccant stream 354 that is recycled from the second co-current contacting system 302B. The movement of the semi-lean desiccant stream 354 from the second co-current contacting system 302B to the first co-current contacting system 302A is aided by a third pump 356, which may cause the semi-lean desiccant stream 354 to flow into the first co-current contacting system 302A at a suitable pressure, for example, of about 103.4 kPa (15 psia) to about 344.7 kPa (50 psia).

The semi-lean desiccant stream 354 is co-currently contacted with the stripping gas 312 within the first co-current contacting system 302A, producing the lean desiccant stream 324 and a first wet stripping gas 322A. The first wet stripping gas 322A may be at a suitable temperature of about 121° C. to 204° C. (250° F. to 400° F.), for example.

The first wet stripping gas 322A and the rich desiccant stream 314, which has been heated to a temperature of about 121° C. to 204° C. (250° F. to 400° F.), are then co-currently contacted within the second co-current contacting system 302B. Contacting the first wet stripping gas 322A and the rich desiccant stream 314 at such a high temperature allows for a greater degree of regeneration than can be achieved with the stripping gas alone. The resulting semi-lean desiccant stream 354 is then pumped back into the first co-current contacting system 302A, and the second wet stripping gas 322B is sent to the second separation system 304, as described with respect to FIG. 3A.

The process flow diagram of FIG. 3B is not intended to indicate that the desiccant regenerator 352 is to include all of the components shown in FIG. 3B. Further, any number of additional components may be included within the desiccant regenerator 352, depending on the details of the specific implementation.

Figure 3C:
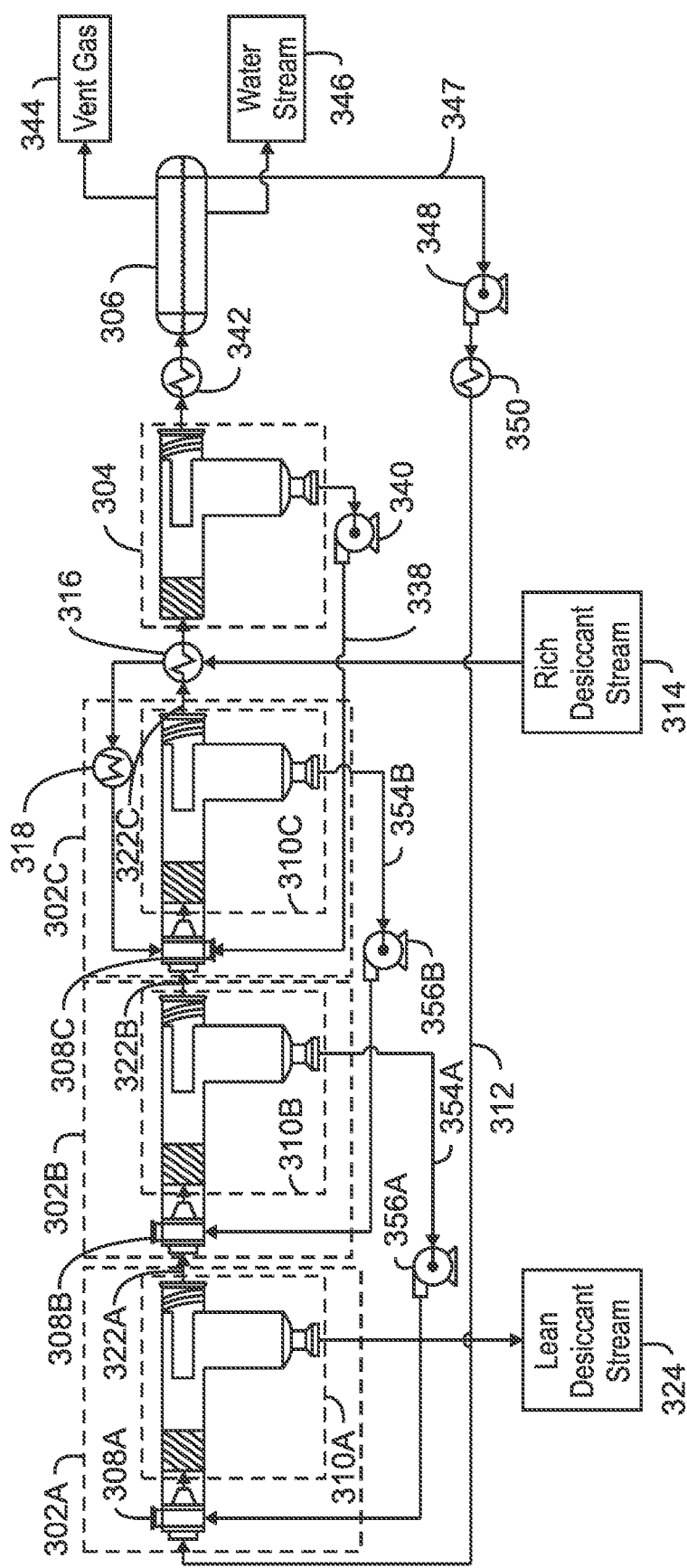
FIG. 3C is a process flow diagram of another desiccant regenerator that includes a co-current flow scheme.

FIG. 3C is a process flow diagram of another desiccant regenerator 358 that includes a co-current flow scheme Like numbered items are as described with respect to FIGS. 3A and 3B. The desiccant regenerator 358 of FIG. 3C is the same as the desiccant regenerator 352 of FIG. 3B, except that the desiccant regenerator 358 of FIG. 3C demonstrates how any number of co-current contacting systems may be used according to embodiments described herein. According to the embodiment shown in FIG. 3C, three co-current contacting systems 302A-C are provided in series within the desiccant regenerator 352. A first semi-lean desiccant stream 354A exiting the second co-current contacting system 302B is recycled to the first co-current contacting system 302A, and a second semi-lean desiccant stream 354B exiting the third co-current contacting system 302C is recycled to the second co-current contacting system 302B.

The process flow diagram of FIG. 3C is not intended to indicate that the desiccant regenerator 358 is to include all of the components shown in FIG. 3C. Further, any number of additional components may be included within the desiccant regenerator 358, depending on the details of the specific implementation. For example, while only three co-current contacting systems 302A-C are shown within the desiccant regenerator 358 of FIG. 3C, it is to be understood that any number of additional co-current contacting systems may be included within the desiccant regenerator 358. Moreover, while inter-stage recycling of the first semi-lean desiccant stream 354A and the second semi-lean desiccant stream 354B is shown in FIG. 3C, it is to be understood that the desiccant regenerator 358 may be configured in any suitable manner to accommodate both inter-stage and intra-stage desiccant recycling. For example, a portion of the first semi-lean desiccant streams 354A exiting the second co-current contacting system 302B may be recycled into the second co-current contacting system 302B via intra-stage recycling.

Co-Current Contacting System

Figure 4:
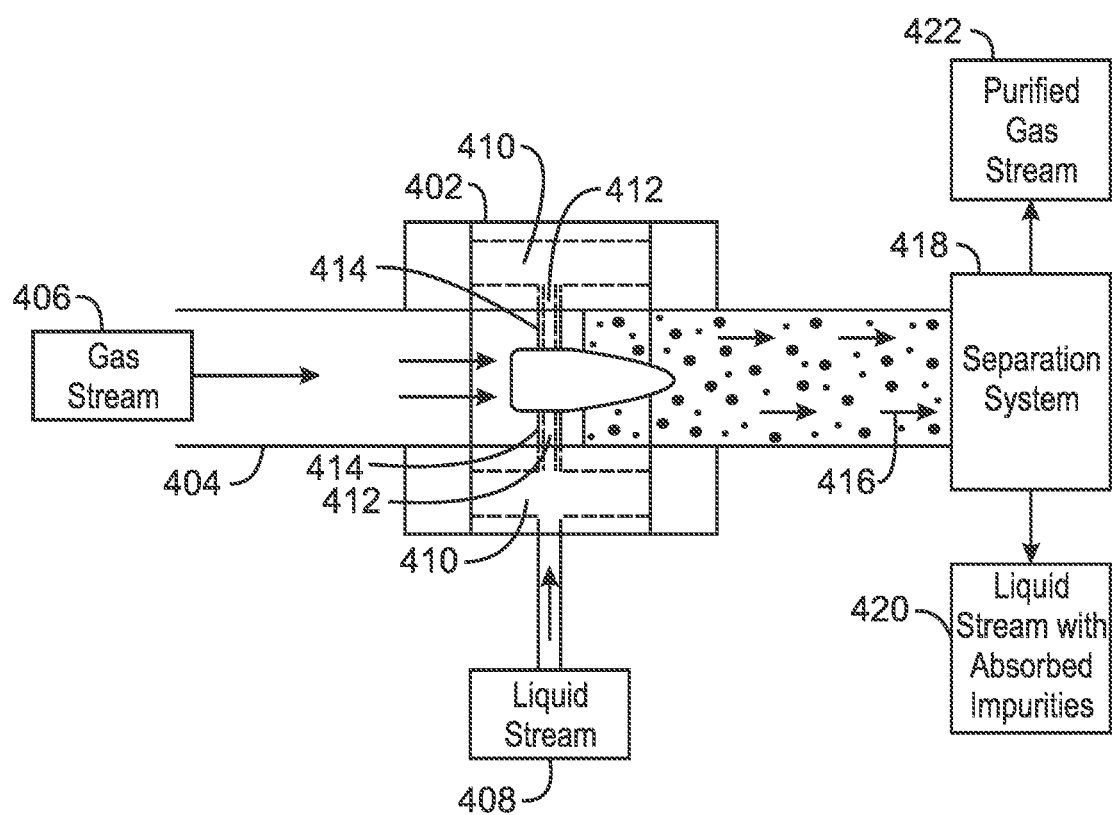
FIG. 4 is a schematic of a co-current contacting system.

FIG. 4 is a schematic of a co-current contacting system 400. The co-current contacting system 400 provides for the separation of components within a gas stream or a liquid stream. Specifically, in the case of gas dehydration, a liquid stream, such as a lean desiccant stream, may be used for the separation of water from a natural gas stream. However, in the case of desiccant regeneration, a gas stream, such as stripping gas, may be used for the separation of water from a liquid stream, such as a rich desiccant stream. For the sake of simplicity, the embodiment shown in FIG. 4 relates to the use of a gas stream to separate impurities from a liquid stream.

In various embodiments, the co-current contacting system 400 aids in the implementation of various gas processing systems, such as the gas processing system 200 of FIGS. 2A and 2B, where the rapid separation of components is desired. Moreover, in some embodiments, the co-current contacting system 400 is one of the co-current contacting systems 226A-C, 236, and 302A-C described with respect to FIGS. 2B and 3A-C.

The co-current contacting system 400 includes a co-current contactor 402 that is positioned in-line within a pipe 404. The co-current contactor 402 includes a number of components that provide for the efficient contacting of a liquid droplet stream with a flowing gas stream 406.

As shown in FIG. 4, the gas stream 406 is flowed through the pipe 404 and into the co-current contactor 402. A liquid stream 408 is also flowed into the co-current contactor 402, for example, into a hollow space 410 coupled to flow channels 412 in the co-current contactor 402. The liquid stream 408 may include any type of absorbent liquid that is capable of removing the impurities from the gas stream 406.

From the flow channels 412, the liquid stream 408 is released into the gas stream 406 as fine droplets through liquid injection orifices 414, resulting in a treated gas stream 416. The treated gas stream 416 includes small liquid droplets dispersed in a gas phase. The liquid droplets include impurities from the gas stream 406 that were absorbed or dissolved into the liquid stream 408.

The treated gas stream 416 is flowed into a separation system 418, such as a cyclonic separator, a mesh screen, or a settling vessel. The separation system 418 removes the liquid droplets from the gas phase. The liquid droplets include the original liquid stream with the absorbed impurities 420, and the gas phase includes a purified gas stream 422.

The schematic of FIG. 4 is not intended to indicate that the co-current contacting system 400 is to include all of the components shown in FIG. 4. Further, any number of additional components may be included within the co-current contacting system 400, depending on the details of the specific implementation.

Figure 5A:
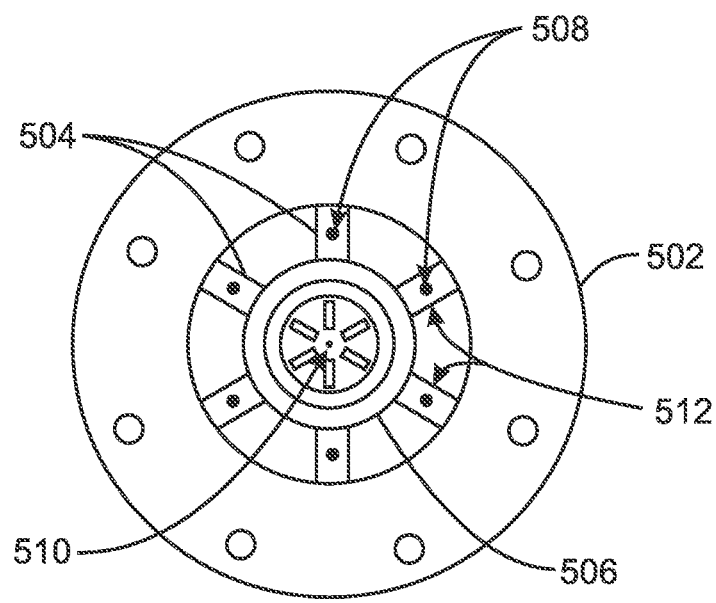
FIG. 5A is a front view of a co-current contactor.
Figure 5B:
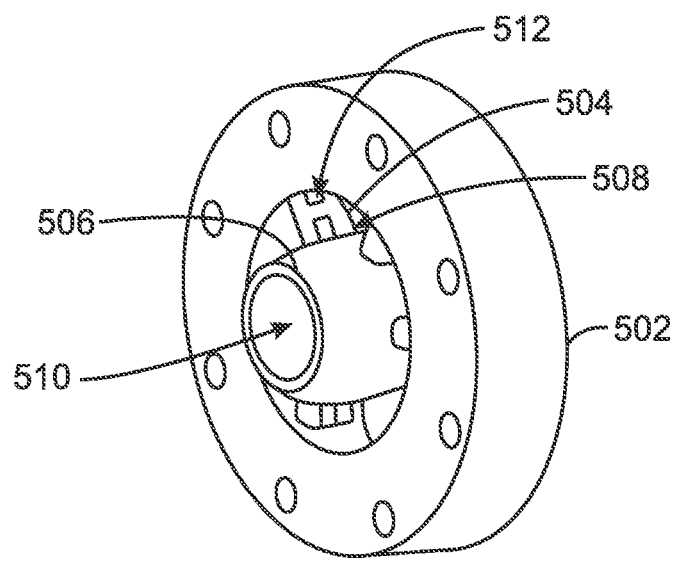
FIG. 5B is a side perspective view of the co-current contactor.
Figure 5C:
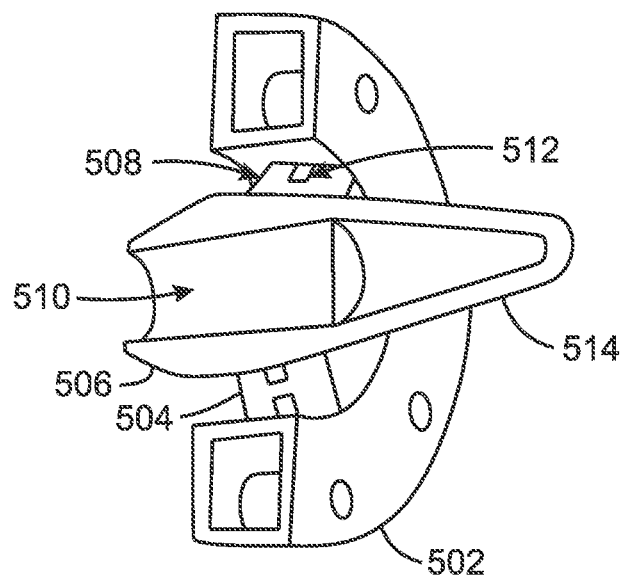
FIG. 5C is a cross-sectional side perspective view of the co-current contactor.
Figure 5D:
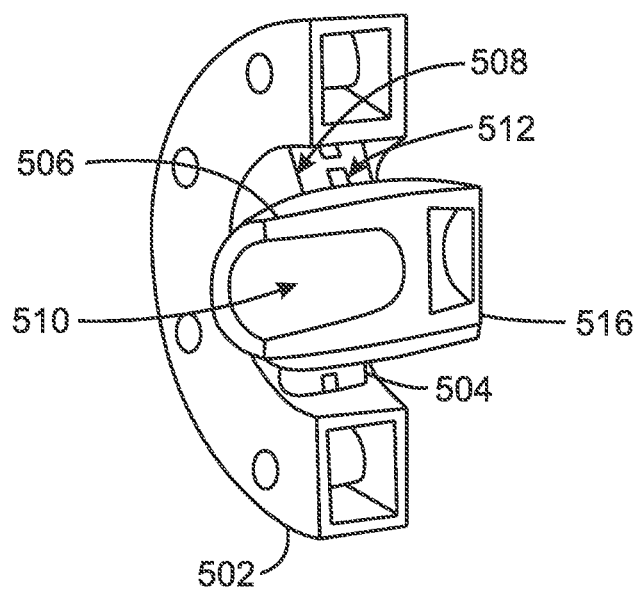
FIG. 5D is another cross-sectional side perspective view of the co-current contactor.

FIG. 5A is a front view of a co-current contactor 500. In various embodiments, the co-current contactor 500 is implemented within a co-current contacting system, such as any of the co-current contacting systems 226A-C, 236, 302A-C, and 400 described with respect to FIGS. 2B, 3A-C, and 4. The co-current contactor 500 is an axial, in-line co-current contactor located within a pipe (not shown). The front view of the co-current contactor 500 represents an upstream view of the co-current contactor 500.

The co-current contactor 500 includes an outer annular support ring 502, a number of radial blades 504 extending from the annular support ring 502, and a central gas entry cone 506. The annular support ring 502 secures the co-current contactor 500 in-line within the pipe. In addition, the radial blades 504 provide support for the central gas entry cone 506.

The annular support ring 502 is designed as a flanged connection, or as a removable or fixed sleeve inside the pipe. In addition, the annular support ring 502 includes a liquid feed system (not shown) and a hollow channel (not shown). A liquid stream is fed to the co-current contactor 500 via the hollow channel in the annular support ring 502. The hollow channel allows for equal distribution of the liquid stream along the perimeter of the co-current contactor 500.

Small liquid channels within the annular support ring 502 provide a flow path for the liquid stream to flow through liquid injection orifices 508 within the radial blades 504. The liquid injection orifices 508 are located on or near the leading edge of each radial blade 504. Placement of the liquid injection orifices 508 on the radial blades 504 allows the liquid stream to be uniformly distributed in a gas stream that is directed between the radial blades 504. Specifically, the liquid stream is contacted by the gas stream flowing through the gaps between the radial blades 504, and is sheared into small droplets and entrained in the gas phase.

The gas stream is also flowed into the central gas entry cone 506 through a gas inlet 510. The central gas entry cone 506 blocks a cross-sectional portion of the pipe. The radial blades 504 include gas exit slots 512 that allow the gas stream to be flowed out of the central gas entry cone 506. This may increase the velocity of the gas stream as it flows through the pipe. The central gas entry cone 506 directs a predetermined amount of the gas stream to the gas exit slots 512 on the radial blades 504.

Some of the liquid stream injected through the radial blades 504 may be deposited on the surface of the radial blades 504 as a liquid film. As the gas stream flows through the central gas entry cone 506 and is directed out of the gas exit slots 512 on the radial blades 504, the gas stream may sweep, or blow, much of the liquid film off the radial blades 504. This may enhance the dispersion of the liquid stream into the gas phase. Further, the obstruction to the flow of the gas stream and the shear edges created by the central gas entry cone 506 may provide a zone with an increased turbulent dissipation rate. The may result in the generation of smaller droplets that enhance the mass transfer rate of the liquid stream and the gas stream.

The size of the co-current contactor 500 may be adjusted such that the gas stream flows at a high velocity. This may be accomplished by either a sudden reduction in the diameter of the annular support ring 502 or a gradual reduction in the diameter of the annular support ring 502. The outer wall of the co-current contactor 500 may be slightly converging in shape, terminating at the point where the gas stream and the liquid stream are discharged into the downstream pipe. This may allow for the shearing and re-entrainment of any liquid film that is removed from the co-current contactor 500. Further, a radial inward ring, grooved surface, or other suitable equipment may be included on the outer diameter of the co-current contactor 500 near the point where the gas stream and the liquid stream are discharged into the downstream pipe. This may enhance the degree of liquid entrainment within the gas phase.

The downstream end of the co-current contactor 500 may discharge into a section of pipe (not shown). The section of pipe may be a straight section of pipe, or a concentric expansion section of pipe. In some embodiments, the central gas entry cone 506 terminates with a blunt ended cone or a tapered ended cone. In other embodiments, the central gas entry cone 506 terminates with a ridged cone, which may include multiple concentric ridges along the cone that provide multiple locations for droplet generation. In addition, any number of gas exit slots 512 may be provided on the cone itself to allow for the removal of the liquid film from the co-current contactor 500.

FIG. 5B is a side perspective view of the co-current contactor 500. Like numbered items are as described with respect to FIG. 5A. As shown in FIG. 5B, the upstream portion of the central gas entry cone 506 extends further into the pipe than the annular support ring 502 and the radial blades 504 in the upstream direction. The downstream portion (not shown) of the central gas entry cone 506 may also extend further into the pipe than the annular support ring 502 and the radial blades 504 in the downstream direction. The length of the central gas entry cone 506 in the downstream direction depends on the type of cone at the end of the central gas entry cone 506, as discussed further with respect to FIGS. 5C and 5D.

FIG. 5C is a cross-sectional side perspective view of the co-current contactor 500. Like numbered items are as described with respect to FIGS. 5A and 5B. According to the embodiment shown in FIG. 5C, the central gas entry cone 506 of the co-current contactor 500 terminates with a tapered ended cone 514. Terminating the central gas entry cone 506 with a tapered ended cone 514 may reduce the overall pressure drop in the pipe caused by the co-current contactor 500.

FIG. 5D is another cross-sectional side perspective view of the co-current contactor 500. Like numbered items are as described with respect to FIGS. 5A-C. According to the embodiment shown in FIG. 5D, the central gas entry cone 506 of the co-current contactor 500 terminates with a blunt ended cone 516. Terminating the central gas entry cone 506 with a blunt ended cone 516 may encourage droplet formation in the center of the pipe.

Method for Regenerating a Liquid Desiccant

FIG. 6 is a process flow diagram showing a method 600 for regenerating a liquid desiccant. In various embodiments, the method 600 is implemented by a desiccant regenerator, such as the desiccant regenerators 210, 300, 352, and 358 described with respect to FIGS. 2A, 2B, and 3A-C. Moreover, in some embodiments, the method 600 is implemented within a gas processing system, such as the gas processing system 200 described with respect to FIGS. 2A and 2B.

The method begins at block 602, at which a temperature of a rich desiccant stream including water is increased using a heating device. In some embodiments, this is accomplished by cross exchanging the rich desiccant stream with a wet stripping gas exiting a co-current contacting system and, optionally, flowing the rich desiccant stream through a heater.

At block 604, the rich desiccant stream is co-currently contacted with a stripping gas within a co-current contacting system such that the stripping gas removes at least a portion of the water from the rich desiccant stream, producing a wet stripping gas and a lean desiccant stream. In various embodiments, the co-current contacting system is the same as, or similar to, the co-current contacting systems 236 and 302 described with respect to FIGS. 2B and 3A.

According to embodiments described herein, the co-current contacting system includes a co-current contactor and a separation system. In various embodiments, the rich desiccant stream is flowed into the co-current contactor via an annular support ring and a number of radial blades extending from the annular support ring, wherein the annular support ring secures the co-current contactor in-line within a pipe. The stripping gas is flowed into the co-current contactor via a central gas entry cone that is supported by the radial blades, wherein a first portion of the stripping gas flows through the central gas entry cone and a second portion of the stripping gas flows around the central gas entry cone between the radial blades. The rich desiccant stream is then contacted with the stripping gas to provide for efficient entrainment of the water from the rich desiccant stream within the stripping gas, and the stripping gas including the entrained water is removed from the rich desiccant stream, producing the wet stripping gas and the lean desiccant stream.

At block 606, residual desiccant is removed from the wet stripping gas within a desiccant separation system. In some embodiments, the residual desiccant is then combined with the rich desiccant stream upstream of the co-current contacting system.

The method 600 then continues to block 608, at which a temperature of the wet stripping gas is decreased using a cooling device. At block 610, the water is removed from the wet stripping gas within a stripping gas separation system, regenerating the stripping gas. In various embodiments, this includes regenerating a condensed stripping gas. The pressure of the condensed stripping gas may then be increased using a pump, and the condensed stripping gas may be vaporized using a vaporizer, regenerating the stripping gas that is recirculated into the co-current contacting system.

In some embodiments, the stripping gas separation system is a harp separator or a pipe separator. Moreover, in some embodiments, the stripping gas separation system also produces a water stream and a vent gas. In embodiments in which the desiccant regenerator is implemented in a subsea environment, the desiccant regenerator may be configured to dispose of the water stream and the vent gas within the subsea environment.

At block 612, the stripping gas is recirculated into the co-current contacting system. The method 600 may then be repeated, starting at block 602.

Figure 6:
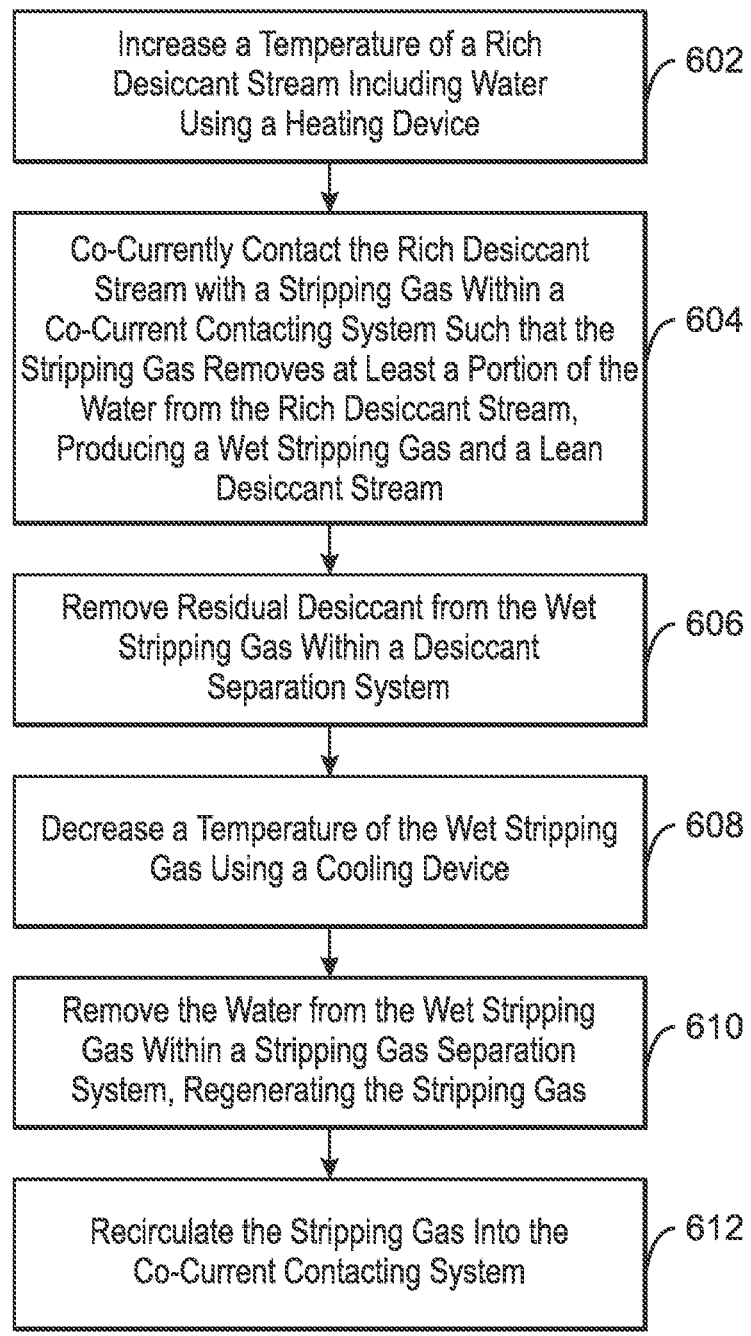
FIG. 6 is a process flow diagram showing a method for regenerating a liquid desiccant.

The process flow diagram of FIG. 6 is not intended to indicate that the steps of the method 600 are to be executed in any particular order, or that all of the steps of the method 600 are to be included in every case. For example, in some embodiments, any of blocks 602, 606, and 608 may be omitted from the method 600. Further, any number of additional steps not shown in FIG. 6 may be included within the method 600, depending on the details of the specific implementation.

In some embodiments, the method 600 includes progressively removing the water from the rich desiccant stream using a number of co-current contacting systems connected in series (or any other suitable configuration). In those embodiments, a respective desiccant stream exiting any of the co-current contacting systems may be recycled to a previous co-current contacting system via inter-stage recycling. In addition, a respective desiccant stream exiting any of the co-current contacting systems may be recycled to the same co-current contacting system via intra-stage recycling.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A desiccant regenerator, comprising:
a co-current contacting system configured to co-currently contact a rich desiccant stream comprising water with a stripping gas such that the stripping gas removes at least a portion of the water from the rich desiccant stream, producing a wet stripping gas and a lean desiccant stream; and
a stripping gas separation system configured to remove the water from the wet stripping gas, regenerating the stripping gas, wherein the stripping gas separation system comprises a three phase separator that produces the stripping gas, the water, and a vent gas;
wherein the desiccant regenerator is configured to recirculate the stripping gas into the co-current contacting system.

2. The desiccant regenerator of claim 1, wherein the co-current contacting system comprises:
a co-current contactor located in-line within a pipe, the co-current contactor comprising:
an annular support ring configured to maintain the co-current contactor within the pipe;
a plurality of radial blades configured to allow the rich desiccant stream to flow into the co-current contactor; and
a central gas entry cone configured to allow the stripping gas to flow through a hollow section within the co-current contactor;
wherein the co-current contactor provides for efficient entrainment of the water from the rich desiccant stream within the stripping gas; and
a separation system configured to remove the stripping gas comprising the entrained water from the rich desiccant stream, producing the wet stripping gas and the lean desiccant stream.

3. The desiccant regenerator of claim 1, further comprising one or more co-current contacting systems within the desiccant regenerator, wherein a heating device configured to increase a temperature of the rich desiccant stream is upstream of at least one of the one or more co-current contacting systems.

4. The desiccant regenerator of claim 1, wherein the stripping gas separation system comprises a harp separator or a pipe separator.

5. The desiccant regenerator of claim 1, comprising a desiccant separation system located upstream of the stripping gas separation system; wherein the desiccant separation system is configured to remove residual desiccant from the wet stripping gas; and wherein the desiccant regenerator is configured to combine the residual desiccant with the rich desiccant stream upstream of the co-current contacting system.

6. The desiccant regenerator of claim 1, comprising a cooler configured to decrease a temperature of the wet stripping gas upstream of the stripping gas separation system.

7. The desiccant regenerator of claim 1, wherein the desiccant regenerator is implemented in a subsea environment, and wherein the desiccant regenerator is configured to dispose of the water stream and the vent gas within the subsea environment.

8. The desiccant regenerator of claim 1, wherein the stripping gas separation system regenerates a condensed stripping gas, and wherein the desiccant regenerator comprises:
a pump to increase a pressure of the condensed stripping gas; and
a vaporizer to vaporize the condensed stripping gas, regenerating the stripping gas that is recirculated into the co-current contacting system.

9. The desiccant regenerator of claim 1, comprising a plurality of co-current contacting systems configured to progressively remove the water from the rich desiccant stream.

10. The desiccant regenerator of claim 9, wherein a respective desiccant stream exiting any of the plurality of co-current contacting system is recycled into a previous one of the plurality of co-current contacting systems via inter-stage recycling.

11. A gas processing system, comprising:

a gas dehydrator configured to:

co-currently contact a natural gas stream comprising water with a lean desiccant stream within a first co-current contacting system to produce a dehydrated natural gas stream and a rich desiccant stream comprising the water; and send the rich desiccant stream to a desiccant regenerator; and the desiccant regenerator configured to:

co-currently contact the rich desiccant stream with a stripping gas within a second co-current contacting system to produce the lean desiccant stream and a wet stripping gas comprising the water;

process the wet stripping gas by a three phase separator to remove the water and a vent gas from the wet stripping gas within a stripping gas separation system to regenerate the stripping gas; and recirculate the stripping gas to the second co-current contacting system;

wherein the gas processing system is configured to recycle the lean desiccant stream to the gas dehydrator.

12. The gas processing system of claim 11, wherein the desiccant regenerator comprises a desiccant separation system located upstream of the stripping gas separation system; wherein the desiccant separation system is configured to remove residual desiccant from the wet stripping gas; and wherein the desiccant regenerator is configured to combine the residual desiccant with the rich desiccant stream upstream of the second co-current contacting system.

13. The desiccant regenerator of claim 1, further comprising a flash drum upstream of the co-current contacting system configured to remove an absorbed natural gas.

* * * * *